(12) United States Patent
Gu et al.

(10) Patent No.: US 6,332,573 B1
(45) Date of Patent: Dec. 25, 2001

(54) PRODUCE DATA COLLECTOR AND PRODUCE RECOGNITION SYSTEM

(75) Inventors: Yeming Gu; Michael A. Spencer, both of Suwanee; Donald A. Collins, Jr., Lawrenceville, all of GA (US); Jeffrey P. Treptau, Golden Valley, MN (US); Stephen J. Ames, Lawrenceville, GA (US); Daniel B. Seevers, Duluth, GA (US); Rex A. Aleshire, Buford, GA (US); Hong Tang, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/189,783

(22) Filed: Nov. 10, 1998

(51) Int. Cl.$^7$ .................................................. G06K 7/10
(52) U.S. Cl. ............................ 235/462.06; 235/462.11; 235/462.14; 359/863
(58) Field of Search .................................. 359/869, 863, 359/850; 235/462.06, 462.01, 462.11, 462.14, 462.41, 462.42

(56) References Cited

U.S. PATENT DOCUMENTS

| | | | |
|---|---|---|---|
| D. 389,076 | 1/1998 | Beckstrom et al. | D10/91 |
| 3,737,239 | 6/1973 | Adams et al. | 356/177 |
| 3,796,863 | 3/1974 | Nickl et al. | 235/61.11 E |
| 3,865,490 | 2/1975 | Grossman | 356/76 |
| 3,970,375 | 7/1976 | Blau, Jr. et al. | 350/312 |
| 3,973,849 | 8/1976 | Jackson et al. | 356/97 |
| 4,043,646 | 8/1977 | Heine et al. | 350/315 |
| 4,060,327 | 11/1977 | Jacobowitz et al. | 356/96 |
| 4,106,628 | 8/1978 | Warkentin et al. | 209/74 M |
| 4,120,591 | 10/1978 | van Valkenburg | 356/178 |
| 4,136,954 | 1/1979 | Jamieson | 356/349 |
| 4,175,862 | 11/1979 | DiMatteo et al. | 356/375 |
| 4,260,262 | 4/1981 | Webster | 356/418 |
| 4,281,933 | 8/1981 | Houston et al. | 356/425 |
| 4,319,830 | 3/1982 | Roach | 355/1 |
| 4,515,275 | 5/1985 | Mills et al. | 209/558 |
| 4,529,308 | 7/1985 | Rife | 356/323 |
| 4,532,757 | 8/1985 | Tutle | 56/328 R |
| 4,534,470 | 8/1985 | Mills | 209/585 |
| 4,558,786 | 12/1985 | Lane | 209/558 |
| 4,558,953 | 12/1985 | Yamada | 356/409 |
| 4,678,904 | 7/1987 | Saaski et al. | 250/227 |
| 4,692,607 | * 9/1987 | LeBelle et al. | 250/205 |
| 4,735,323 | 4/1988 | Okada et al. | 209/582 |
| 4,750,161 | 6/1988 | Takeuchi et al. | 369/45 |
| 4,779,982 | 10/1988 | Koshi et al. | 356/318 |
| 4,810,937 | 3/1989 | Havel | 315/152 |
| 4,888,647 | 12/1989 | Wada | 358/474 |
| 4,899,348 | 2/1990 | Kiya et al. | 372/38 |

(List continued on next page.)

FOREIGN PATENT DOCUMENTS

| | | | |
|---|---|---|---|
| 0758081 | 2/1997 | (EP) . | |
| 9746856 | 12/1997 | (EP) . | |
| 405122447 | * 5/1993 | (JP) | H04N/1/04 |

Primary Examiner—Karl D. Frech
Assistant Examiner—Daniel St. Cyr
(74) Attorney, Agent, or Firm—Paul W. Martin

(57) ABSTRACT

A produce data collector and produce recognition system which illuminates a produce item with substantially uniform light to enhance the accuracy of collected produce data and subsequent identification of the produce item as part of a transaction in a transaction establishment. The produce data collector includes a light source for illuminating the produce item with substantially uniform light during the transaction, a light separating element for splitting light collected from the produce item into a plurality of different light portions having different wavelengths, a detector for converting energy in the plurality of light portions into a plurality of electrical signals, and control circuitry which digitizes the plurality of electrical signals to produce a digital spectrum from the produce item which contains information to identify the produce item for the purpose of determining its unit price.

52 Claims, 8 Drawing Sheets

U.S. PATENT DOCUMENTS

| | | | | |
|---|---|---|---|---|
| 4,907,884 | | 3/1990 | Wyatt et al. | 356/336 |
| 4,917,500 | | 4/1990 | Lugos | 356/406 |
| 4,928,008 | | 5/1990 | Huggins et al. | 250/231.1 |
| 4,929,819 | * | 5/1990 | Collins, Jr. | 235/383 |
| 4,930,865 | | 6/1990 | Dosmann | 350/169 |
| 4,944,594 | | 7/1990 | Burk | 356/446 |
| 4,954,972 | | 9/1990 | Sullivan | 364/526 |
| 4,964,053 | | 10/1990 | Humble | 364/466 |
| 4,968,138 | | 11/1990 | Scott et al. | 356/121 |
| 4,988,205 | * | 1/1991 | Snail | 356/446 |
| 5,000,569 | | 3/1991 | Nylund | 356/237 |
| 5,021,645 | | 6/1991 | Satula et al. | 250/223 R |
| 5,083,638 | | 1/1992 | Schneider | 186/61 |
| 5,085,325 | | 2/1992 | Jones et al. | 209/580 |
| 5,088,823 | * | 2/1992 | Smith et al. | 356/328 |
| 5,095,319 | | 3/1992 | Watarai et al. | 346/108 |
| 5,097,291 | | 3/1992 | Suzuki | 355/69 |
| 5,115,888 | | 5/1992 | Schneider | 186/61 |
| 5,118,183 | * | 6/1992 | Cargill et al. | 356/73 |
| 5,153,926 | | 10/1992 | Jansson et al. | 382/54 |
| 5,166,755 | * | 11/1992 | Gat | 356/419 |
| 5,247,373 | | 9/1993 | Iwama et al. | 358/471 |
| 5,274,497 | * | 12/1993 | Casey | 359/364 |
| 5,286,980 | | 2/1994 | Richert | 250/560 |
| 5,309,270 | | 5/1994 | Yamakawa | 359/196 |
| 5,319,437 | | 6/1994 | Van Aken et al. | 356/326 |
| 5,325,445 | | 6/1994 | Herbert | 382/38 |
| 5,333,739 | | 8/1994 | Stelte | 209/582 |
| 5,339,107 | | 8/1994 | Henry et al. | 348/270 |
| 5,394,246 | * | 2/1995 | Sugawara | 356/394 |
| 5,420,681 | | 5/1995 | Woodruff | 356/356 |
| 5,426,282 | | 6/1995 | Humble | 235/383 |
| 5,428,558 | | 6/1995 | Cahill et al. | 364/571.02 |
| 5,444,528 | | 8/1995 | Puschell | 356/73 |
| 5,449,911 | | 9/1995 | Crezee | 250/341.7 |
| 5,453,883 | | 9/1995 | Chazallet | 359/890 |
| 5,461,698 | | 10/1995 | Ryczek | 250/226 |
| 5,471,311 | | 11/1995 | van den Bergh et al. | 356/446 |
| 5,479,258 | | 12/1995 | Hinnrichs et al. | 356/326 |
| 5,483,335 | | 1/1996 | Tobias | 356/310 |
| 5,483,337 | * | 1/1996 | Barnard et al. | 356/316 |
| 5,483,339 | | 1/1996 | Van Aken et al. | 356/326 |
| 5,494,136 | | 2/1996 | Humble | 186/61 |
| 5,495,096 | | 2/1996 | Ogata et al. | 235/462 |
| 5,537,488 | | 7/1996 | Menon et al. | 382/170 |
| 5,546,475 | | 8/1996 | Bolle et al. | 382/190 |
| 5,576,527 | * | 11/1996 | Sawanobori | 235/455 |
| 5,585,615 | * | 12/1996 | Iwanami et al. | 235/472 |
| 5,589,717 | * | 12/1996 | Chau | 356/328 |
| 5,610,385 | * | 3/1997 | He et al. | 235/467 |
| 5,619,029 | * | 4/1997 | Roxby et al. | 235/472 |
| 5,642,197 | | 6/1997 | Tuhro et al. | 356/418 |
| 5,646,399 | | 7/1997 | Fukushima et al. | 250/226 |
| 5,649,070 | | 7/1997 | Connell et al. | 395/77 |
| 5,659,624 | | 8/1997 | Fazzari et al. | 382/110 |
| 5,675,070 | | 10/1997 | Gelperin | 73/23.34 |
| 5,675,419 | | 10/1997 | Van Den Bergh et al. | 356/446 |
| 5,678,132 | | 10/1997 | Shiba et al. | 399/59 |
| 5,680,220 | | 10/1997 | Delignieres et al. | 356/406 |
| 5,684,582 | | 11/1997 | Eastman et al. | 356/328 |
| 5,822,061 | * | 10/1998 | Delhaye et al. | 356/326 |
| 5,842,070 | * | 11/1998 | Arackellian et al. | 396/463 |
| 5,867,265 | * | 2/1999 | Thomas | 356/328 |
| 6,005,959 | * | 12/1999 | Mohan et al. | 382/110 |
| 6,041,151 | * | 3/2000 | Mendlovic et al. | 385/16 |
| 6,060,727 | * | 5/2000 | Shakuda | 257/90 |
| 6,085,979 | * | 7/2000 | Maddox | 235/462.13 |
| 6,155,489 | * | 12/2000 | Collins, Jr. et al. | 235/462.14 |

* cited by examiner

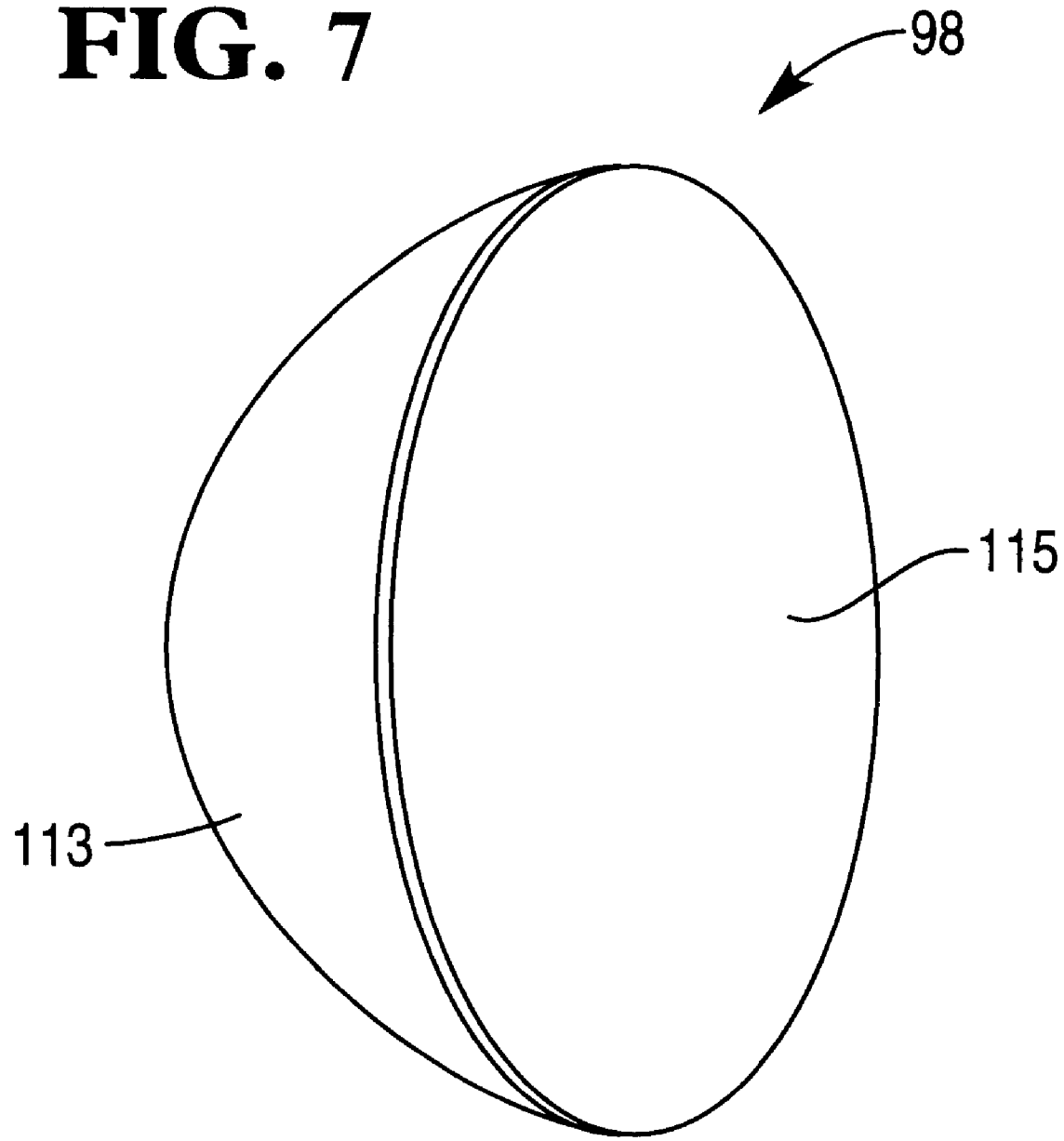

PRODUCE DATA COLLECTOR AND PRODUCE RECOGNITION SYSTEM

CROSS-REFERENCE TO RELATED APPLICATIONS

The present invention is related to the following commonly assigned and co-pending U.S. application:

"An Item Checkout Device Including A Bar Code Data Collector And A Produce Data Collector", filed Nov. 10, 1998, invented by Collins, and having a Ser. No. 09/189,781.

BACKGROUND OF THE INVENTION

The present invention relates to product checkout devices and more specifically to a produce data collector and a produce recognition system.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

Therefore, it would be desirable to provide a produce recognition system which can minimize operator involvement in produce identification and entry into a transaction.

SUMMARY OF THE INVENTION

In accordance with the teachings of the present invention, a produce data collector is provided.

The produce data collector includes a light source for substantially uniformly illuminating the produce item with light during the transaction, a light separating element for splitting light collected from the produce item into a plurality of different light portions having different wavelengths, a detector for converting energy in the plurality of light portions into a plurality of electrical signals, and control circuitry which digitizes the plurality of electrical signals to produce a digital spectrum from the produce item which contains information to identify the produce item for the purpose of determining its unit price.

It is a feature of the present invention that the produce data collector provides substantial uniformity in both spectrum and luminosity across a sample collecting window, without the use of complicated optical devices.

It is accordingly an object of the present invention to provide a produce data collector and system.

It is another object of the present invention to provide a produce data collector which is light in weight and inexpensive.

It is another object of the present invention to provide a produce data collector which digitizes a color spectrum for a produce item.

It is another object of the present invention to provide a produce recognition system which compares digitized produce color spectra from a produce data collector with historical reference spectra.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 7 is a perspective view of an alternate turning mirror design; and

DETAILED DESCRIPTION OF THE PREFERRED EMBODIMENT

Figure 1:
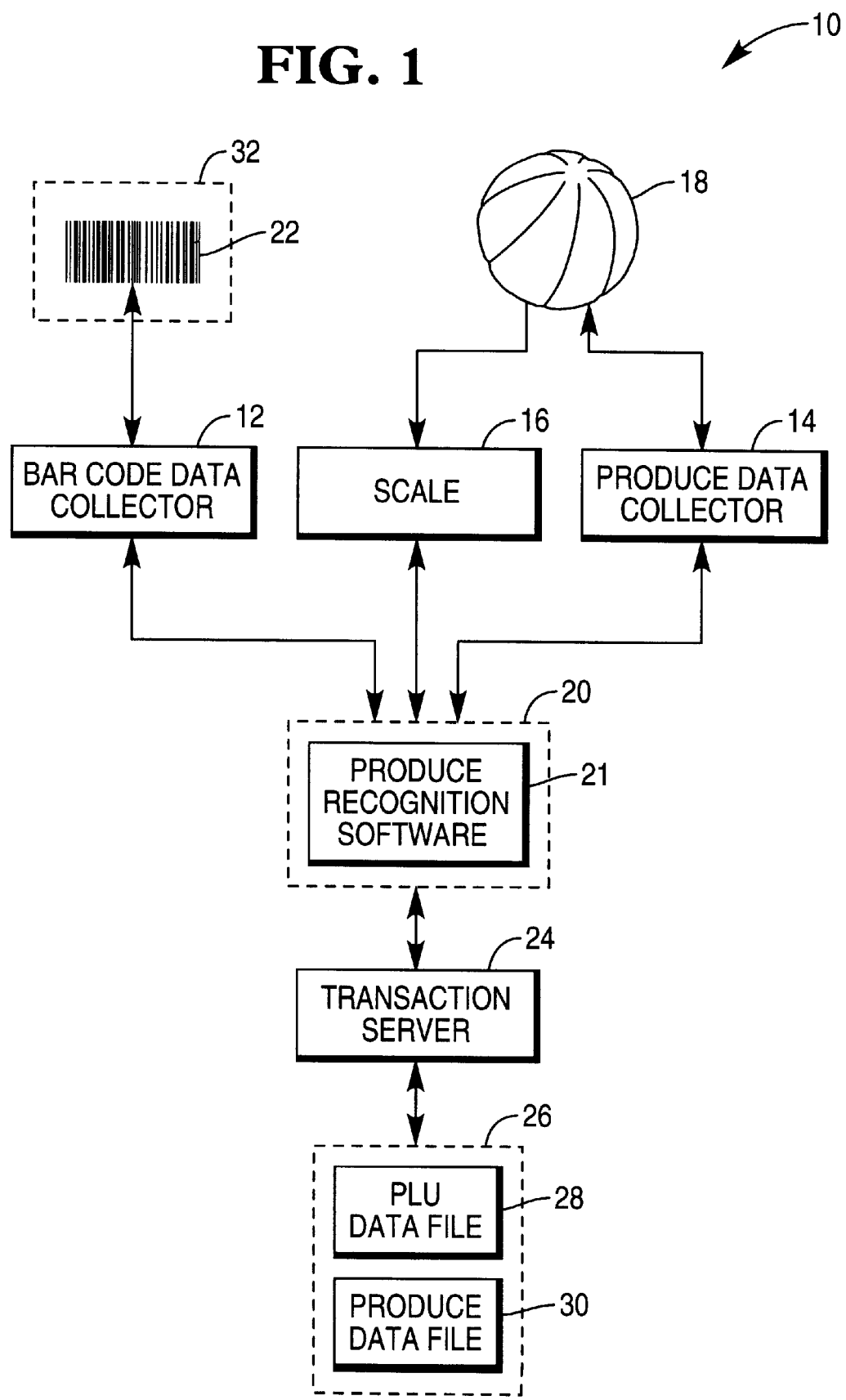
FIG. 1 is a block diagram of a transaction processing system including the produce data collector of the present invention.

Referring now to FIG. 1, transaction processing system 10 includes bar code data collector 12, produce data collector 14, and scale 16.

Bar code data collector 12 reads bar code 22 on merchandise item 32 to obtain an item identification number, also know as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Produce data collector 14 collects data for produce item 18 or any other non-barcoded merchandise item. Such data may include color and color distribution data, size data, shape data, surface texture data, and aromatic data. Reference produce data is collected and stored within produce data file 30. During a transaction, operation of produce data collector 14 may be initiated by placement of produce item 18 on scale 16 or in by operator-initiated commands from transaction terminal 20.

Scale 16 determines a weight for produce item 18. Scale 16 works in connection with bar code data collector 12, but may be designed to operate and be mounted separately. Scale 16 sends weight information for produce item 18 to transaction terminal 20 so that transaction terminal 20 can determine a price for produce item 18 based upon the weight information.

Bar code data collector 12 and produce data collector 14 operate separately from each other, but may be integrated together. Bar code data collector 12 works in conjunction with transaction terminal 20 and transaction server 24.

In the case of bar coded items, transaction terminal 20 obtains the item identification number from bar code data collector 12 and retrieves a corresponding price from PLU data file 28 through transaction server 24.

In the case of non-bar coded produce items, transaction terminal 20 executes produce recognition software 21 which obtains produce characteristics from produce data collector 14, identifies produce item 18 by comparing produce data in produce data file 30 with collected produce data, retrieves an item identification number from produce data file 30 and a corresponding price from PLU data file 28.

In an alternative embodiment, identification of produce item 18 may be handled by transaction server 24. Transaction server 24 receives collected produce characteristics and compares them with produce data in produce data file 30. Following identification, transaction server 24 obtains a price for produce item 18 and forwards it to transaction terminal 20.

PLU data file 28 and produce data file 30 are stored within storage medium 26, but either may also be located instead at transaction terminal 20, or bar code data collector 12.

To assist in proper identification of produce items, produce recognition software 21 may additionally display candidate produce items for operator verification. Produce recognition software 21 preferably arranges the candidate produce items in terms of probability of match and displays them as text and/or color images on an operator display of transaction terminal 20. The operator may accept the most likely candidate returned by or override it with a different choice.

Figure 2:
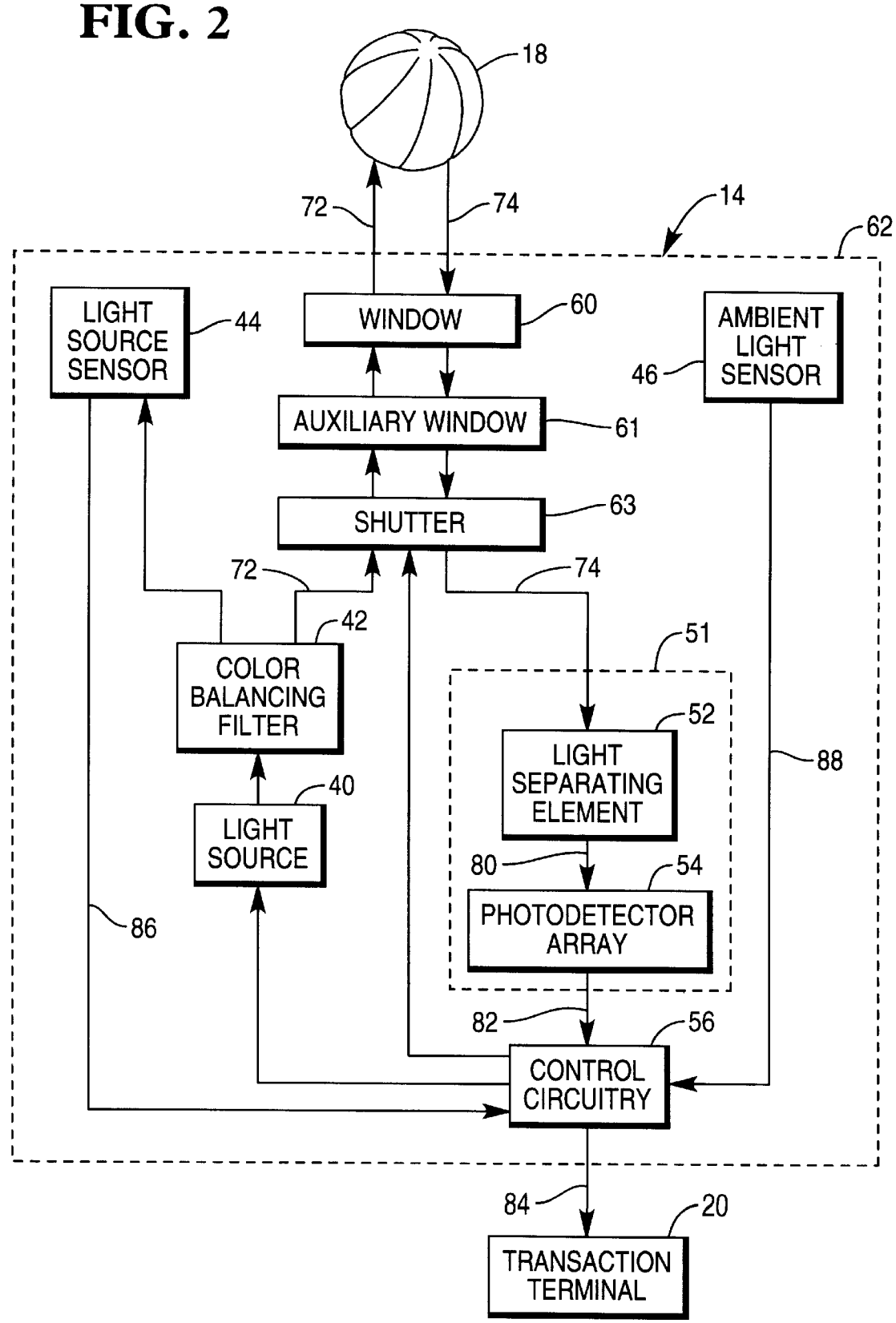
FIG. 2 is a block diagram of the produce data collector.
Figure 3:
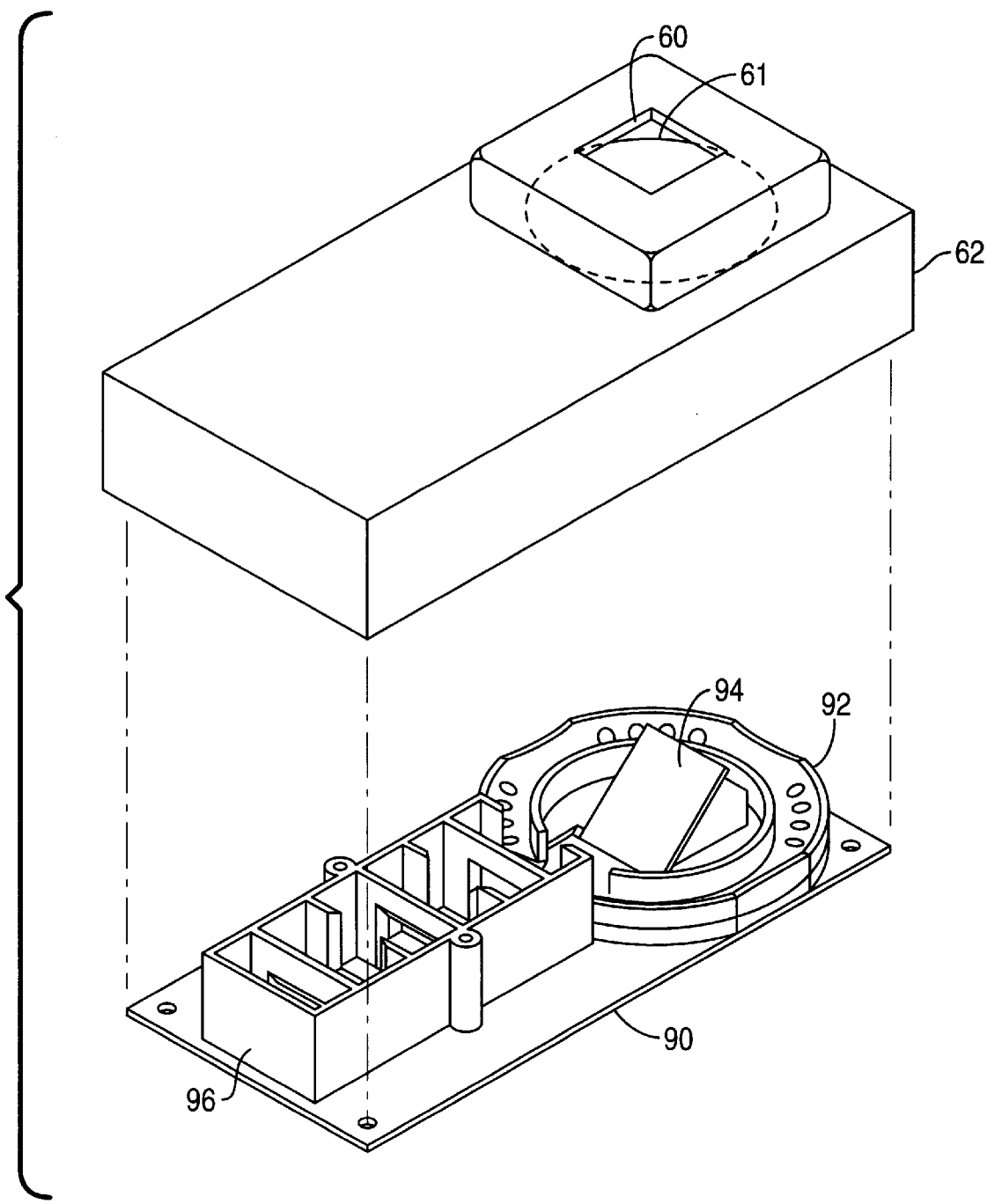
FIG. 3 is an exploded view of the produce data collector.

Turning now to FIG. 2, produce data collector 14 primarily includes light source 40, spectrometer 51, control circuitry 56, transparent window 60, auxiliary transparent window 61, housing 62, and shutter 63. Produce data collector 14 may additionally include color balancing filter 42, light source sensor 44, and ambient light sensor 46.

Light source 40 produces light 70. Light source 40 preferably produces a white light spectral distribution, and preferably has a range from four hundred 400 nm to 700 nm, which corresponds to the visible wavelength region of light.

Light source 40 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. Alternate embodiments include additional LEDs having different colors in narrower wavelength ranges and which are preferably used in combination with the broad-spectrum white light LED to even out variations in the spectral distribution and supplement the spectrum of the broad-spectrum white light LED. Feedback from light source sensor 44 may additionally be employed by control circuitry 56 to adjust desired intensity levels by varying the drive current to the LEDs. Use of these techniques may remove the necessity to use color balancing filter 42, thereby reducing cost, easing packaging constraints, and improving mechanical reliability.

Other types of light sources 40 are also envisioned by the present invention, although they may be less advantageous than the broad spectrum white LED. For example, a tungsten-halogen light may be used because of its broad spectrum, but produces more heat and optimally requires color balancing filter 42.

A plurality of different-colored LEDs having different non-overlapping wavelength ranges may be employed, but may provide less than desirable collector performance if gaps exist in the overall spectral distribution.

Color balancing filter 42 balances spectral throughput and increases the system signal-to-noise ratio when using light sources which alone or in combination with other light sources fail to produce a broad range of intensities across the entire spectral distribution. Color balancing filter 42 is designed to take into account the fact that system spectral throughput or intensity will not be equal for all wavelengths of light due to the intrinsic nature of light source 40, light separating element 52, and photodetector array 54. In designing color balancing filter 42, the spectral emissivity of light source 40, the spectral transmissivity of light separating element 52, and spectral responsivity of photodetector array 54 are all considered.

When employed, color balancing filter 42 preferably includes an absorptive glass filter or a thinfilm filter on a glass substrate or a combination of absorptive and interference filters. Light 72 from color balancing filter 42 passes through windows 60 and 61 to illuminate produce item 18.

Light source sensor 44 monitors the spectrum of light 72 for changes in light source intensity and stability, which would adversely affect the operation of produce data collector 14. Light source sensor 44 includes one or more photodiodes and may include a bandpass filter to monitor only a portion of the emitted spectrum. Light source sensor 44 may also include light source current and voltage monitors for monitoring light source 40 for stability. Output signals 86 are processed by control circuitry 56. Light source sensor 44 could be mounted anywhere within the direct line of sight of light source 40 and can monitor light source 40 directly, instead of monitoring filtered light from color balancing filter 42. In the preferred embodiment, light source sensor 44 looks down at light source 40.

Ambient light sensor 46 senses the level of ambient light through windows 60 and 61 and sends ambient light level signals 88 to control circuitry 56. Ambient light sensor 46 is mounted anywhere within a direct view of window 61. In the preferred embodiment, light source sensor 44 looks down at light source 40.

Spectrometer 51 includes light separating element 52, photodetector array 54.

Light separating element 52 splits light 76 in the preferred embodiment into light 80 of a continuous band of wavelengths. Light separating element 52 is preferably a linear variable filter (LVF), such as the one manufactured Optical Coating Laboratory, Inc., or may be any other functionally equivalent component, such as a prism or a grating.

Photodetector array 54 produces waveform signals 82 containing spectral data. The pixels of the array spatially sample the continuous band of wavelengths produced by light separating element 52, and produce a set of discrete signal levels. Photodetector array 54 is preferably a complimentary metal oxide semiconductor (CMOS) array, but could be a Charge Coupled Device (CCD) array.

Control circuitry 56 controls operation of produce data collector 14 and produces digitized produce data waveform signals 84. For this purpose, control circuitry 56 includes an analog-to-digital (A/D) converter. A twelve bit A/D converter with a sampling rate of 22–44 kHz produces acceptable results.

Control circuitry 56 also receives signals from light source sensor 44 and ambient light sensor 46. In response to changes in light source monitor output signals 86, control circuitry 56 compensates for the changes and/or alerts an operator of transaction terminal 20.

In response to ambient light level signals 88, control circuitry 56 waits for ambient light levels to fall to a minimum level (dark state) before turning on light source 40. Ambient light levels fall to a minimum level when produce item 18 covers window 60. After control circuitry 56 has received waveform signals 82 containing produce data, control circuitry 56 turns off light source 40 and waits for ambient light levels to increase before returning to waiting for the dark state. Ambient light levels increase after produce item 18 is removed from window 60.

Control circuitry 56 controls shutter 63. Control circuitry 56 opens shutter 63 when it detects placement of produce item 18 over window 60. Control circuitry 56 closes shutter 63 when it fails to detect placement of produce item 18 over window 60.

Control circuitry 56 establishes periodic reference readings. Reference readings are desirable since component aging, dirt, and temperature and voltage changes may cause inaccuracies in collected produce data if significant. Control circuitry 56 may take as many readings as necessary. For example, control circuitry 56 may take ten reference readings per second, or one reference reading for each produce item, or five times a day.

Housing 62 contains light source 40, color balancing filter 42, light source sensor 44, ambient light sensor 46, stray light baffle 96, light separating element 52, photodetector array 54, control circuitry 56, and auxiliary transparent window 61. Housing 62 additionally contains transparent window 60 when produce data collector 14 is a self-contained unit. When produce data collector 14 is mounted within the housing of a combination bar code reader and scale, window 60 may be located in a scale weigh plate instead.

Transparent window 60 is mounted above auxiliary transparent window 61. Windows 60 and 61 include an anti-reflective surface coating to prevent light 72 reflected from windows 60 and 61 from contaminating reflected light of 74.

Housing 62 is approximately five and a half inches in length by two and three quarters inches in width by one and three quarters inches in height.

Windows 60 and 61 may be rectangular, elliptical, and circular, instead of square. Windows 60 and 61 are about three quarters inches in width and length (square) or diameter (circular).

Window size affects the size of produce data collector 14. In order to minimize the angle of light reflected off of produce item 18 and received at light separating element 52, while maintaining as large of an output window as possible (in order to provide as a large of a sample area as possible) a minimum distance of approximately five inches is needed between window 60 and light separating element 52. If window 60 is reduced in diameter, thereby reducing the sampled area on produce item 18, the distance between object 18 and light separating element 52 can be reduced, keeping the angle the same.

Shutter 63 is mounted below transparent window 61. Shutter 63 may include a polymer dispersed liquid crystal (PDLC) or a motor-driven door (FIGS. 8A–8B) mounted to the underside of the top wall of housing 62.

The PDLC shutter allows about fifteen percent of ambient light to pass through it when de-energized. Produce data collector 14 takes reference illumination readings with the PDLC shutter energized and de-energized. When produce item 18 is placed over window 60, control circuitry 56 energizes the PDLC shutter, allowing about eighty-five percent of light 72 and eighty-five percent of light 74 to pass through it.

The motor-driven shutter includes a milky-white optically opaque screen with a white (or gray) diffusively-reflecting surface facing down towards detector 54. This surface serves as an internal reference for system calibration. The screen is moved to an open position and a closed position by a motor. Control circuitry 56 controls the motor.

When closed for taking reference readings, the motor-driven shutter prevents substantially all ambient light from passing through while reflecting about eighty-five percent of light 72. When open for taking reference readings or recognizing produce item 18, the motor-driven shutter allows substantially all of light 72 and 74 to pass through, as well as substantially all ambient light.

Operation of produce data collector 14 is automatic. An operator places produce item 18 on window 60. Control circuitry 56 senses low level ambient signals 88 and turns on light source 40. Light separating element 52 separates reflected light 74 into different wavelengths to produce light 80 of a continues band of wavelengths. Photodetector array 54 produces waveform signals 82 containing produce data. Control circuitry 56 produces digitized produce data signals 84 which it sends to transaction terminal 20. Control circuitry 56 turns off light source 40 and waits for ambient light levels to increase before returning to waiting for the dark state. Control circuitry additionally monitors light source monitor output signals 86 for changes and compensates and/or alerts an operator of transaction terminal 20.

Advantageously, produce data collector 14 captures image data in about two tenths of a second, well within normal produce handling time.

Transaction terminal 20 uses produce data in digitized produce data signals 84 to identify produce item 18. Here, produce data consists of digitized waveforms which transaction terminal 20 compares to a library of digitized waveforms stored within produce data file 30. After identification, transaction terminal 20 obtains a unit price from PLU data file 28 and a weight from scale 16 in order to calculate a total cost of produce item 18. Transaction terminal 20 enters the total cost into the transaction.

With reference to FIGS. 3–6, produce data collector 14 is shown in further detail.

Produce data collector 14 additionally includes printed circuit board 90, light source assembly 92, turning mirror 94, stray light baffle 96, and turning mirror 98.

Printed circuit board 90 contains control circuitry 56 and forms a base for mounting color balancing filter 42, light source sensor 44, ambient light sensor 46, mount 49, light separating element 52, photodetector array 54, light source assembly 92, turning mirror 94, stray light baffle 96, and turning mirror 98. Printed circuit board 90 fastens to housing 62. Printed circuit board 90 serves as a carrier for all of the active components in this system, thus when it is manufactured and tested, the entire system can be tested by testing printed circuit board 90.

Light source assembly 92 includes light source 40, lower light source mount 100, and upper light source mount 102.

Light source 40 preferably includes a number of white LEDs which are arranged close to window 60 and in direct line of sight of window 60. Light source mount 92 is designed such that each individual LED is pointed at the top surface of window 60 so that there is uniform luminosity over the entire top surface of window 60 for illuminating produce item 18. In the preferred embodiment, the LEDs are all aimed at the center of window 60 and oriented at an angle of about 31.75 degrees. The LEDs are located at a distance of about 1.657 inches from the center of window 60, and 1.075 inches from the center of light source assembly 92.

The preferred embodiment provides uniformity in both spectrum and luminosity. Since it is highly desirable to avoid using complicated optical devices, such as lens systems and light pipes, for simplicity, the preferred embodiment envisions arrangements of multiple LEDs. The LEDs are spectrally matched in groups, and their placement and orientation achieves optimal uniformity in both spectrum and luminosity across the illuminated surface area.

To achieve uniformity in both spectrum and luminosity with multiple LEDs, the LED samples are first sorted into spectrally matched groups by computing and analyzing the matrices of linear correlation coefficients. The direct illumination from LEDs in a matched group will have a uniform spectrum regardless of their positions and beam orientations.

Second, LED positions and beam orientations are arranged to achieve uniform luminosity. If higher luminosity is needed to achieve adequate signal level, multiple groups can be used. The total illumination from multiple groups will be uniform in both spectrum and luminosity even if the spectra from different groups are different.

Figure 4:
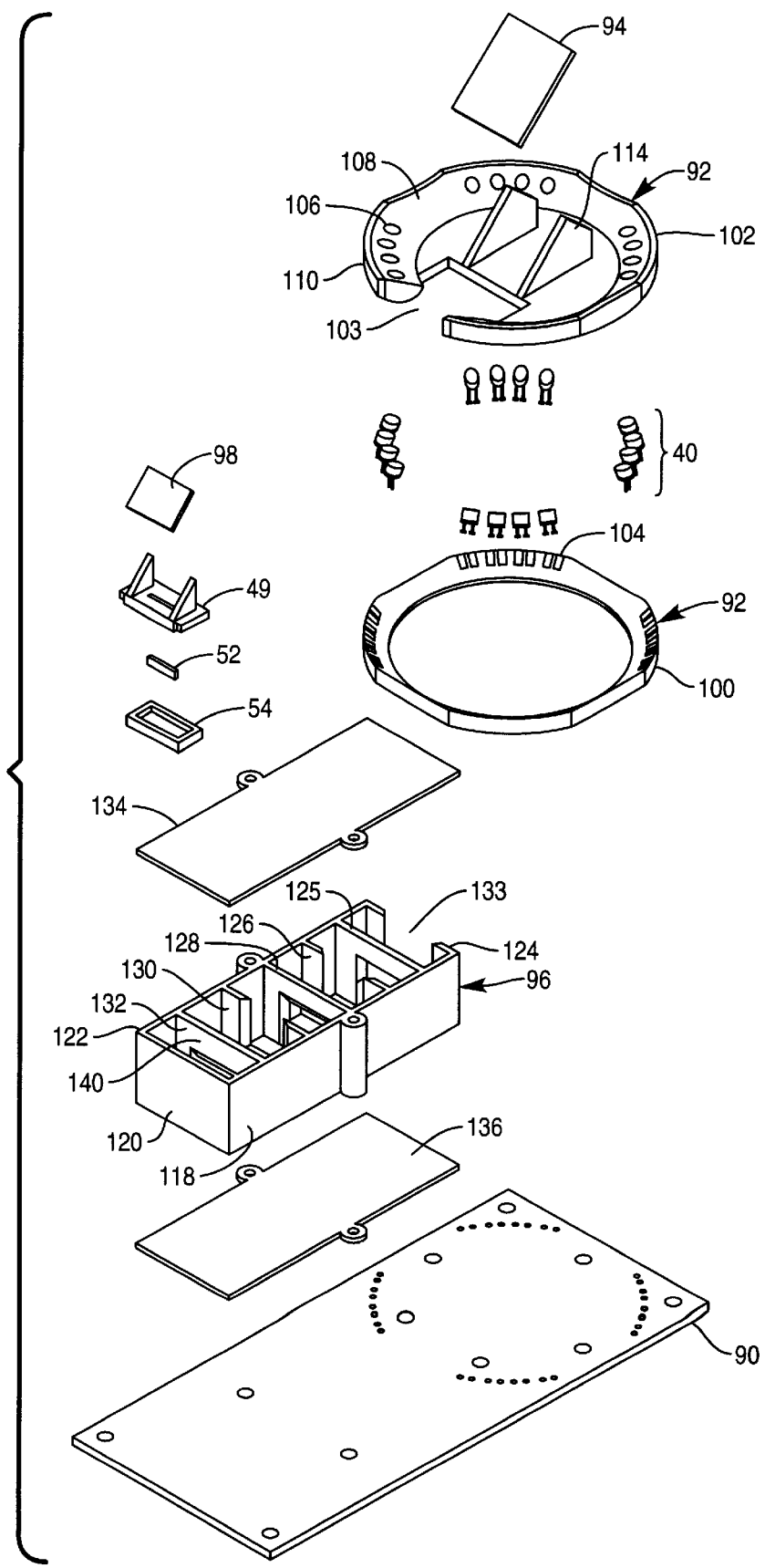
FIG. 4 is an exploded view of the optical components of the produce data collector.
Figure 5:
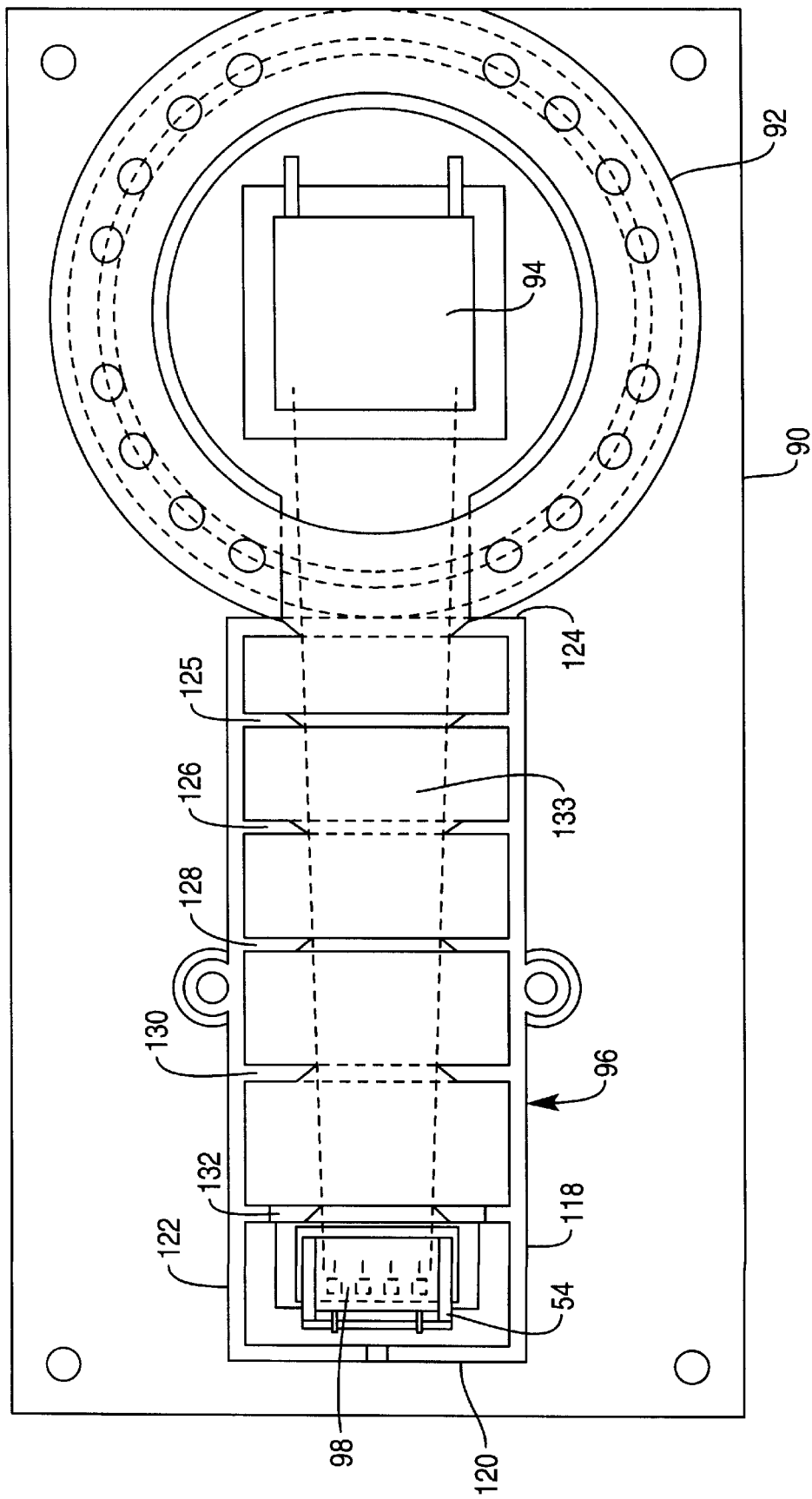
FIG. 5 is a top view of the assembled optical components of the produce data collector.
Figure 6:
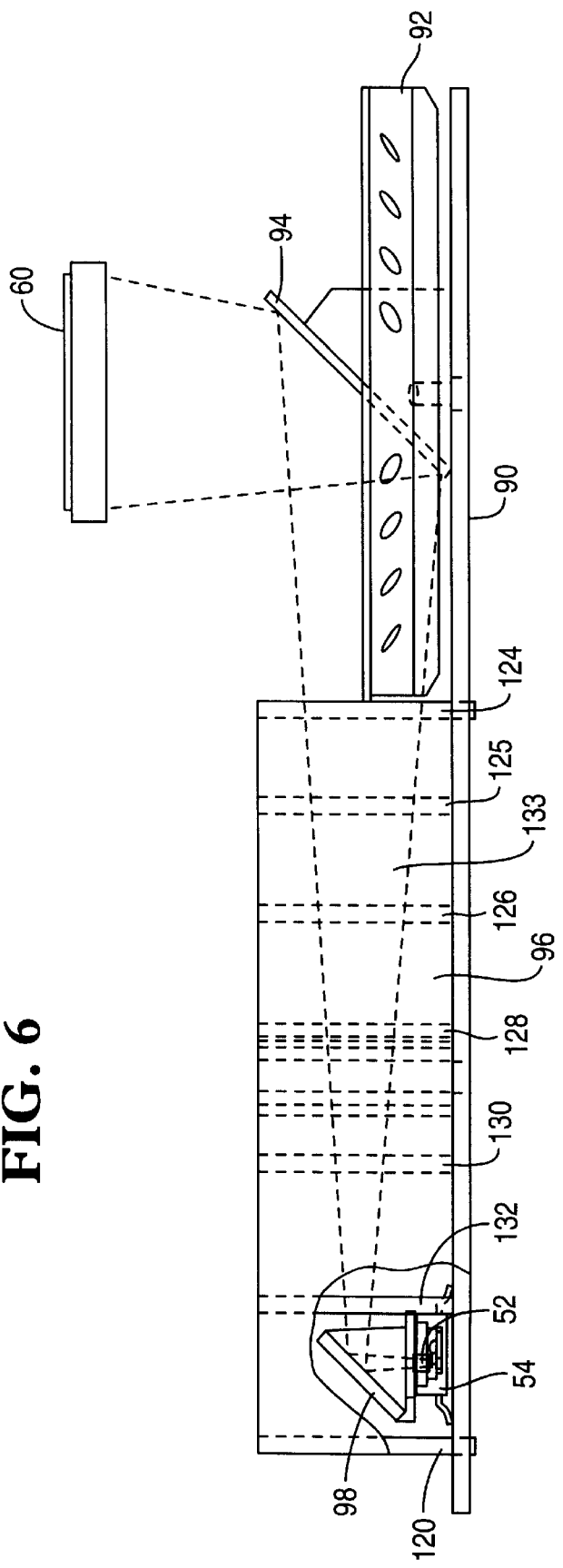
FIG. 6 is a side view of the assembled optical components of the produce data collector.

FIG. 4 shows sixteen white LEDs arranged in four groups of four LEDs on four sides of lower light source mount 100. Other arrangements are also envisioned by the present invention, such as two or four groups of four and eight LEDS. The use of a single white LED is also envisioned because it provides spectral uniformity, providing acceptable luminosity across window 60 only if window 60 is smaller. To achieve higher system efficiency, LEDs with a narrow, concentrated beam are preferred.

Lower light source mount 100 is generally circular in shape. This arrangement supports the LEDs in the preferred arrangement and orientation. Lower light source mount 100 connects mechanically and electrically to printed circuit board 90 and includes terminal connections 104 for light sources 40.

Upper light source mount 102 is also generally circular in shape and connects mechanically in mating relationship to lower light source mount 100. Upper light source mount 102 mechanically hold the LEDs in a preferred orientation for even illumination across the area of window 60. Upper light source mount 102 includes gap 103 which allows reflected light 74 to be directed to photodetector array 54. Upper light source mount 102 further includes apertures 106 through which light sources 40 emit light from positions below top surface 108. Top surface 108 angles downwardly from outer wall 110 to inner wall 112 perpendicular with the inclination angles of lights sources 40.

Turning mirror 94 routes reflected light 74 from produce item 18 through stray light baffle 96 towards turning mirror 98. Deflector mirror 94 is mounted at about a forty-five degree angle on base 114, which is incorporated into upper light source mount 102. Turning mirror 94 is preferably substantially planar and has a rectangular shape.

Turning mirror 98 directs reflected light 74 to light separating element 52. Turning mirror 98 is mounted at about a forty-five degree angle on mount 49. In the preferred embodiment (FIG. 4), turning mirror 98 is substantially planar and has a rectangular shape.

Alternate embodiments (FIG. 7), may incorporate turning mirrors 94 and 98 that are non-planar, i.e., have one or more radii of curvature and/or have the possibility of being segmented into multiple sections, each section with one or more radii of curvature.

In one such alternate embodiment, turning mirror 98 not only directs reflected light 74, but also produces equalized light of average reflected illumination by mixing reflected light 74. For this purpose, turning mirror 98 includes inner concave surface 113 and substantially planar textured surface 115. Textured surface 115 diffuses and scatters reflected light 74. Inner concave surface 113 converges the scattered light to reduce loss.

Alternate turning mirror 98 is made of a molded transparent acrylic and is mounted at about a forty-five degree angle on mount 49. Surface 115 is coated with aluminum using an evaporation process. The aluminum is an enhanced aluminum to provide the highest possible reflectance across the visible spectrum. Enhanced aluminum is ninety-seven percent reflective versus ninety-four A percent reflective for regular aluminum coating.

All embodiments of mirrors 94 and 98 serve to direct light 74 to photodetector array 54.

Stray light baffle 96 mounts directly to printed circuit board 90 and helps to minimize the amount of light from light sources 40 that reaches photodetector array 54 directly, as well as any other sources of light other than the light reflected from produce item 18, such as ambient light. For this purpose, stray light baffle 96 includes outer walls 118–124, inner walls 125–132, top wall 134, and bottom wall 136. Outer walls 118–124 form a generally rectangular assembly. Outer wall 124 is adjacent to upper and lower light source mounts 100 and 102.

Walls 118, 120, 122 and 132 define a chamber containing turning mirror 98, mount 49, light separating element 52, and photodetector array 54. Photodetector array 54 is mounted directly to printed circuit board 90. Light separating element 52 is held within mount 49, which rests directly upon photodetector array 54. Light separating element 52 is held in close proximity to photodetector array 54.

Walls 118–132 cooperate to channel light turning mirror 98 through an ever-narrowing tunnel 133. Walls 125, 126, and 130 are generally U-shaped walls and provide a lower bound for tunnel 133. Walls 124, 128, and 132 are generally inverted U-shaped walls and provide an upper bound for tunnel 133. Tunnel opening 138 at wall 124 for receiving reflected light 74 from deflector mirror 94 is larger than tunnel opening 140 at wall 132. Tunnel openings 138 and 140 are optimally sized to allow as much light energy in reflected light 74 as possible to be incident on photodetector array 54, while restricting the angles of incidence of reflected light 74 to less than six degrees.

Advantageously, the preferred embodiment reduces spectral distortion without significant loss of reflected light levels. Reduction of spectral distortion is particularly important when light separating element 52 is an LVF or a dispersing element, such as a prism or a grating.

To reduce such spectral distortion, the present embodiment reduces the size of the field-of-view in at least two ways. First, light sources 40 are inwardly inclined in order to accommodate a smaller size for window 60 without significant loss in outgoing light levels. Second, distance between window 60 and light separating element 52 is increased to an optimum distance, consistent with the fact that the angle for light incident upon light separating element 52 must be less than six degrees. If the angle is greater than six degrees then there is unequal attenuation through light separating element 52 which adds error to the system. In other words, produce item 18 will appear to have different spectra characteristics when located at different locations on window 60.

As an alternate embodiment, a light pipe, or a light pipe in combination with a preceding condenser lens, may also be used between window 60 and light separating element 52 to further reduce the field-of-view effect by adding distance.

A third technique is to shift the LVF center such that its longer wavelength (red) end is closer to the center line of window 60, instead of aligning the LVF center along an optical path to the center of window 60. By placing the red end closer to the center, average incident angle is reduced for the longer wavelengths. Therefore, the absolute wavelength shift is smaller for longer wavelengths, while the opposite is true for the shorter wavelengths (the blue end). This technique works regardless of window shape.

Advantageously, housing 62 is small in size. In particular, it is much smaller than other produce data collectors, such as video cameras. Produce data collector 14 is even small enough in size to be mounted within an existing bar code reader or packaged as a light-weight (less than about eight ounces) hand-held unit.

Figure 8A:
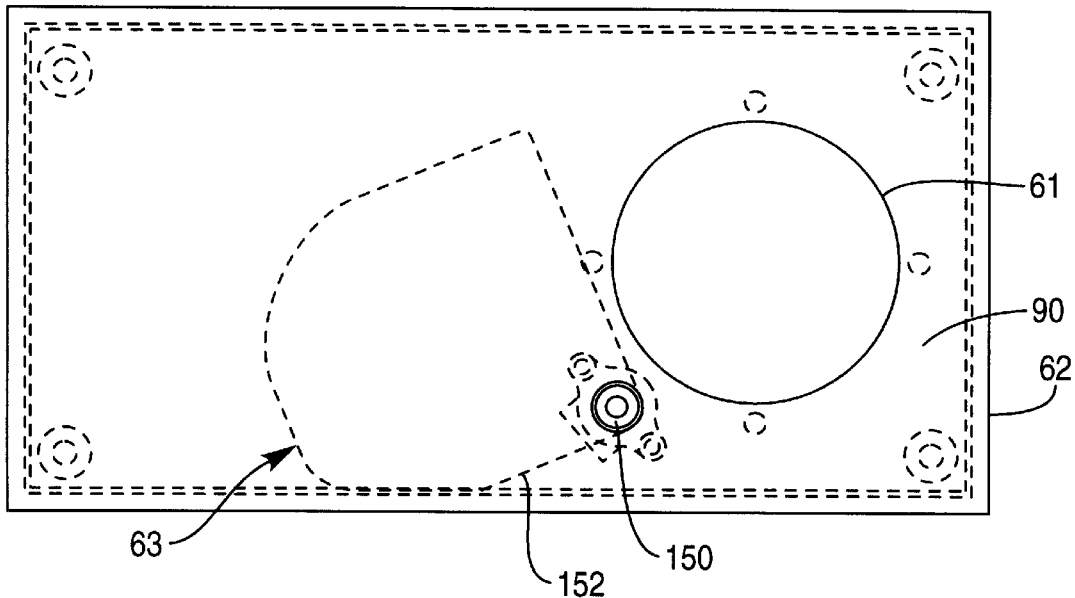
FIGS. 8A and 8B illustrate an electromechanical shutter arrangement.
Figure 8B:
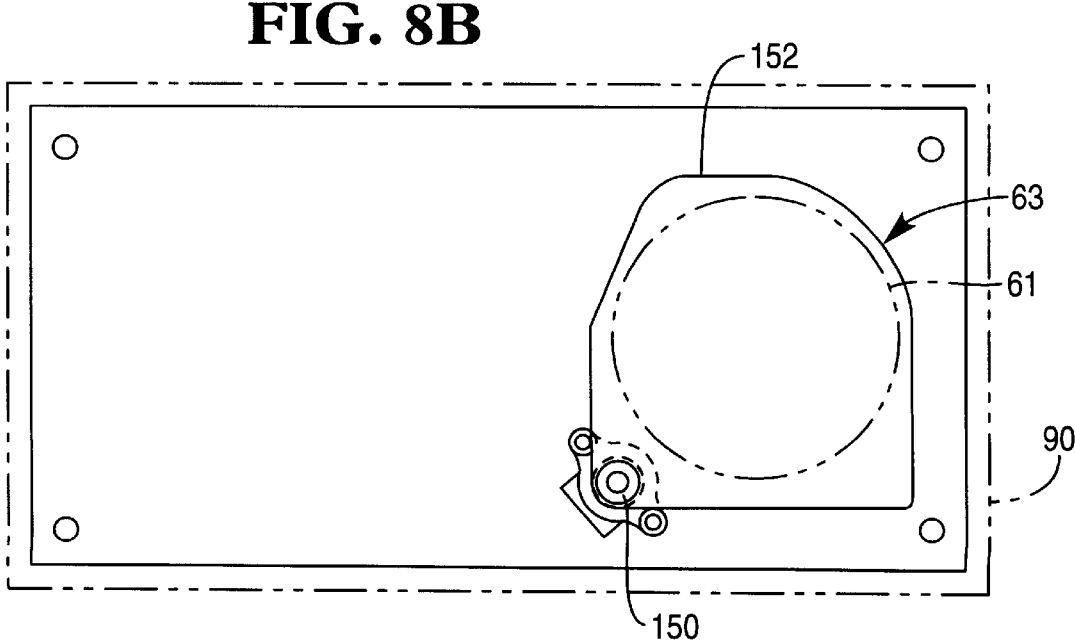

Turning now to FIGS. 8A-8B, electromechanical shutter 63 is mounted below and adjacent window 61. FIG. 8A shows both housing 62 and printed circuit board 90, while FIG. 8B shows only printed circuit 90.

Shutter 63 includes motor 150 and door 152. Motor 150 is mounted to printed circuit board 90. Door 152 is mounted to the shaft of motor 150. Control circuitry 56 energizes motor 150 to place door 152 in an open position (FIG. 8A) and a closed position (FIG. 8B).

Although the invention has been described with particular reference to certain preferred embodiments thereof, variations and modifications of the present invention can be effected within the spirit and scope of the following claims. In particular, alternate embodiments may be further reduced or enlarged in size as window 60 is made smaller or larger. Also, the number light source 40 may change, but all of these variations are incorporated in the scope of present invention and may be considered alternative embodiments.

We claim:

1. A produce data collector for processing a produce item as part of a transaction in a transaction establishment comprising:
    a light source for illuminating the produce item with substantially uniform light during the transaction including a plurality of matched LEDs which collectively provide substantially white light with substantial spectral uniformity;
    a light separating element for splitting light collected from the produce item into a plurality of different light portions having different wavelengths including a linear variable filter;
    a detector for converting energy in the plurality of light portions into a plurality of electrical signals; and
    control circuitry which digitizes the plurality of electrical signals to produce a digital spectrum from the produce item which contains information to identify the produce item for the purpose of determining its unit price.

2. The produce data collector as recited in claim 1, wherein the detector comprises:
    an array of photodetectors for converting energy in the plurality of light portions into a plurality of electrical signals.

3. The produce data collector as recited in claim 1, wherein the control circuitry comprises:
    an analog-to-digital (A/D) convertor.

4. The produce data collector as recited in claim 1, further comprising:
    a color balancing filter for balancing spectral throughput from the LEDs and increasing a signal-to-noise ratio of the control circuitry.

5. The produce data collector as recited in claim 1, further comprising:
    a light source sensor for monitoring the LEDS for variation in intensity and for producing signals indicative of the intensity;
    wherein the control circuitry varies drive current to each LED to compensate for the variation in intensity.

6. The produce data collector as recited in claim 1, further comprising:
    an ambient light sensor for sensing intensity of ambient light and for producing signals indicative of the intensity;
    wherein the control circuitry turns on the LEDs after ambient light intensity has fallen to a minimum level indicative of placement of the produce item in a data collection position.

7. The produce data collector as recited in claim 1, further comprising:
    a shutter for obscuring ambient light;
    wherein the control circuitry opens and closes the shutter to take reference ambient light readings.

8. The produce data collector as recited in claim 7, wherein the shutter comprises:
    a polymer dispersed liquid crystal (PDLC).

9. The produce data collector as recited in claim 7, wherein the shutter comprises:
    a door; and
    a motor for moving the door to an open position and to a closed position.

10. The produce data collector as recited in claim 1, further comprising:
    a housing containing a first aperture through which the light for illuminating the produce item and the light collected from the produce item pass.

11. The produce data collector as recited in claim 10, wherein the LEDs provide uniform luminosity across the aperture.

12. The produce data collector as recited in claim 10, wherein the plurality of LEDS are arranged around and substantially equidistantly from a center line through the aperture.

13. The produce data collector as recited in claim 10, wherein the aperture is no larger in area than about ¾ inch by ¾ inch.

14. The produce data collector as recited in claim 10, wherein the housing comprises:
    a window in the aperture.

15. The produce data collector as recited in claim 14, wherein the housing further comprises:
    an anti-reflective coating on an inner side of the window which minimizes a portion of the light for illuminating the produce item which reflects from the inner side of the window.

16. The produce data collector as recited in claim 10, further comprising:
    a number of mirrors within the housing for directing the collected light to the light separating element.

17. The produce data collector as recited in claim 16, wherein the mirrors comprise:
    a first mirror oriented at about a forty-five degree angle for re-directing the collected light from a first direction to a second direction at about ninety degrees from the first direction; and
    a second mirror oriented at about a forty-five degree angle for re-directing the collected light from the second direction to a third direction towards the light separating element at about ninety degrees from the second direction.

18. The produce data collector as recited in claim 17, wherein the first and second mirrors comprise planar mirrors.

19. The produce data collector as recited in claim 17, wherein one of the first and second mirrors also mixes the collected light to produce equalized light of average reflected illumination.

20. The produce data collector as recited in claim 19, wherein the one mirror comprises:
   an optical element having a inner concave inner surface and a planar surface; and
   a textured reflective layer on the planar surface which diffuses and scatters the collected light;
   wherein the inner concave inner surface converges scattered collected light.

21. The produce data collector as recited in claim 20, wherein the optical element is made of molded transparent acrylic.

22. The produce data collector as recited in claim 20, wherein the textured reflective layer comprises enhanced aluminum.

23. The produce data collector as recited in claim 10, further comprising:
   a baffle within the housing between the light source and the light separating element for minimizing an amount of the light from the light source which is directly incident upon the light separating element.

24. The produce data collector as recited in claim 23, wherein the baffle comprises:
   a plurality of adjacent chambers, including a first chamber closest to the light source and a second chamber farthest away from the light source;
   wherein the light separating element is located in the second chamber.

25. The produce data collector as recited in claim 10, further comprising:
   a mount for the light source within the housing which anchors the light source and which orients the light source in a position and orientation sufficient to provide uniform luminosity illumination across the aperture.

26. The produce data collector as recited in claim 10, wherein the light separating element comprises:
   a first end for processing a first wavelength of the collected light and a second end for processing a second wavelength of the collected light shorter than the first wavelength;
   wherein the first end is aligned with a center of the aperture.

27. A produce data collector for processing a produce item as part of a transaction in a transaction establishment comprising:
   a housing containing an aperture;
   a window in the aperture;
   a plurality of light emitting diodes (LEDs) within the housing which collectively produce substantially white light with substantial spectral uniformity for illuminating the produce item as it rests upon the window during the transaction;
   a mount for the LEDS within the housing which anchors the LEDs and which orients the LEDs in circular fashion and around and substantially equidistantly from a center line through the aperture in an orientation sufficient to provide uniform luminosity illumination across the window;
   a linear variable filter (LVF) within the housing for splitting light collected from the produce item into a plurality of different light portions having different wavelengths;
   a number of mirrors within the housing for directing the collected light to the LVF;
   a baffle within the housing between the LEDs and the LVF for shielding the LVF from the light from the LEDs; and
   a detector within the housing for converting energy in the plurality of light portions into a plurality of electrical signals which contain information to identify the produce item for the purpose of determining its unit price, including a photodetector array.

28. A produce recognition system for processing a produce item as part of a transaction in a transaction establishment comprising:
   a checkout station for completing the transaction;
   a produce data collector in the checkout station including
      a plurality of light emitting diodes (LEDs) within the housing which collectively produce substantially white light with substantial spectral uniformity for illuminating the produce item with substantially uniform light as it rests upon the window during the transaction;
      a linear variable filter (LVF) for splitting light collected from the produce item into a plurality of different light portions having different wavelengths;
      a detector for converting energy in the plurality of light portions into a plurality of electrical signals;
      control circuitry within the checkout station which digitizes the plurality of electrical signals to produce a digital spectrum from the produce item;
      a database of reference digital spectra; and
      a computer within the checkout station and coupled to the control circuitry and the database which compares the digital spectrum from the produce item with the reference digital spectra to identify the produce item for the purpose of determining its unit price and which adds the produce item to the transaction.

29. The system as recited in claim 28, wherein the computer identifies a number of likely choices for the produce item, displays the choices, and records selection of one of the choices by an operator.

30. The system as recited in claim 28, wherein the produce data collector weighs less than about eight ounces.

31. The system as recited in claim 28, wherein the produce data collector further comprises:
   a housing containing a window upon which the produce item is placed;
   wherein the window has an area which is less than about ¾ of an inch by ¾ of an inch.

32. A system for processing a produce item as part of a transaction in a transaction establishment comprising:
   a checkout station for completing the transaction;
   a produce data collector in the checkout station including
      a plurality of light emitting diodes (LEDs) within the housing which collectively produce substantially white light with substantially spectral uniformity for illuminating the produce item with substantially uniform light as it rests upon the window during the transaction;
      a linear variable filter (LVF) for splitting light collected from the produce item into a plurality of different light portions having different wavelengths;
      a detector for converting energy in the plurality of light portions into a plurality of electrical signals;
      control circuitry within the checkout station which digitizes the plurality of electrical signals to produce a digital spectrum from the produce item;

a first database of reference digital spectra;

a second database of price information correlated to item identification information;

a scale in the checkout station for providing weight information from the produce item; and a computer within the checkout station and coupled to the control circuitry, the first and second databases, and the scale, which compares the digital spectrum from the produce item with the reference digital spectra in the first database to determine item identification information for the produce item, which obtains unit price information from the second database using the item identification information for the item, and which determines a price for the produce item from the unit price information and the weight information, and which adds the price of the produce item to the transaction.

33. A method of identifying a produce item as part of a transaction in a transaction establishment comprising the steps of:

(a) illuminating the produce item with substantially uniform white light with substantial spectral uniformity during the transaction by a plurality of matched light emitting diodes (LEDs) arranged in circular fashion and substantially equidistantly from the produce item and oriented at angles sufficient to concentrate substantially all of the light from the LEDs at the produce item;

(b) splitting light collected from the produce item into a plurality of different light portions having different wavelengths by a linear variable filter (LVF);

(c) converting energy in the plurality of light portions into a plurality of electrical signals;

(d) digitizing the plurality of electrical signals to produce a digital spectrum from the produce item; and (e) comparing the digital spectrum to reference spectra to identify the produce item.

34. The method as recited in claim 33, wherein step b comprises the substep of:

(b-1) locating a first end of the LVF which processes a first wavelength of the collected light in an optical path along a center line through an aperture through which the light for illuminating the produce item and ambient light pass.

35. The method as recited in claim 33, wherein step b comprises the substep of:

(b-1) locating a first end of the LVF which processes red wavelengths of the collected light in an optical path along a center line through an aperture through which the light for illuminating the produce item and ambient light pass.

36. The method as recited in claim 33, wherein step (c) comprises the substep of:

(c-1) converting energy in the plurality of light portions into a plurality of electrical signals by an array of photodetectors.

37. The method as recited in claim 33, wherein step (d) comprises the substep of:

(d) digitizing the plurality of electrical signals by an analog-to-digital (A/D) convertor.

38. The method as recited in claim 33, further comprising the step of:

(f) balancing spectral throughput from the light source.

39. The method as recited in claim 33, further comprising the steps of:

(f) sensing variations in intensity in the light from the light source; and (g) varying drive current to the light source to compensate for the variations in intensity.

40. The method as recited in claim 33, further comprising the step of:

(f) sensing intensity of ambient light before step (a).

41. The method as recited in claim 40, wherein step (a) comprises the substep of:

(a-1) illuminating the produce item with light after the intensity of the ambient light has fallen to a minimum level.

42. The method as recited in claim 33, further comprising the steps of:

(f) taking reference digital spectrum readings before step (a);

(g) storing the reference readings; and (h) correcting the digital spectrum obtained in step (d) using the reference readings.

43. The method as recited in claim 42, wherein step (f) comprises the substep of:

(f-1) opening and closing a shutter under an aperture through which the light for illuminating the produce item and ambient light pass.

44. The method as recited in claim 43, wherein substep (f-1) comprises the substeps of:

(f-1-A) closing the shutter;

(f-1-B) taking a first reference reading;

(f-1-C) turning on the light source;

(f-1-D) taking a second reference reading;

(f-1-E) opening the shutter;

(f-1-F) taking a third reference reading;

(f-1-G) turning off the light source; and (f-1-H) taking a fourth reference reading.

45. The method as recited in claim 43, wherein substep (f-1) comprises the substep of:

(f-1-A) energizing and de-energizing a polymer dispersed liquid crystal (PDLC).

46. The method as recited in claim 43, wherein substep (f-1) comprises the substep of:

(f-1-A) energizing a motor to open and close a door coupled to the motor.

47. The method as recited in claim 33, further comprising the step of:

(f) minimizing a portion of the light for illuminating the produce item which reflects from an inner side of a window through which the light for illuminating the produce item and ambient light pass.

48. The method as recited in claim 33, further comprising the step of:

(f) re-directing the collected light from a first direction to a second direction by a number of mirrors.

49. The method as recited in claim 48, further comprising the step of:

(g) mixing the collected light to produce equalized light of average reflected illumination by one of the mirrors.

50. The method as recited in claim 48, further comprising the step of:

(g) minimizing an amount of the light for illuminating the produce item which mixes with the collected light.

51. The method as recited in claim 33, wherein step (e) comprises the substep of:

(e-1) identifying a number of likely choices for the produce item.

52. The method as recited in claim 51, further comprising the steps of:

(f) displaying the choices; and (h) recording selection of one of the choices by an operator.

* * * * *